United States Patent
Yoshida et al.

(10) Patent No.: US 10,586,627 B2
(45) Date of Patent: *Mar. 10, 2020

(54) SPARK PLUG

(71) Applicant: NGK SPARK PLUG CO., LTD., Nagoya-shi, Aichi (JP)

(72) Inventors: Haruki Yoshida, Tajimi (JP); Kuniharu Tanaka, Komaki (JP); Shun Kondo, Obu (JP); Yutaka Yokoyama, Kasugai (JP); Yusuke Nomura, Niwa-gun (JP); Michitaka Yamada, Tajimi (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/015,967

(22) Filed: Jun. 22, 2018

(65) Prior Publication Data

US 2018/0374601 A1 Dec. 27, 2018

(30) Foreign Application Priority Data

Jun. 27, 2017 (JP) .................... 2017-125610

(51) Int. Cl.
*H01B 3/12* (2006.01)
*C04B 35/117* (2006.01)
(Continued)

(52) U.S. Cl.
CPC .............. *H01B 3/12* (2013.01); *C04B 35/111* (2013.01); *C04B 35/117* (2013.01); *H01T 13/38* (2013.01); *H01T 13/60* (2013.01); *C04B 2235/3201* (2013.01); *C04B 2235/3206* (2013.01); *C04B 2235/3208* (2013.01); *C04B 2235/3215* (2013.01); *C04B 2235/3217* (2013.01); *C04B 2235/3227* (2013.01); *C04B 2235/3418* (2013.01); *C04B 2235/72* (2013.01);
(Continued)

(58) Field of Classification Search
CPC ...... C04B 35/114; C04B 35/117; H01T 13/38
See application file for complete search history.

(56) References Cited

U.S. PATENT DOCUMENTS 8,093,791 B2 * 1/2012 Kurono ................ C04B 35/111
 313/118
9,362,722 B2 * 6/2016 Takaoka ................ H01T 13/38
(Continued)

FOREIGN PATENT DOCUMENTS

WO 2013-128525 A1 9/2013

*Primary Examiner* — Karl E Group
(74) *Attorney, Agent, or Firm* — Stites & Harbison, PLLC; Jeffrey A. Haeberlin; Gary N. Stewart

(57) ABSTRACT

The spark plug includes an insulator made from an alumina-based sintered body, and the insulator contains 90 to 98 wt % of an Al component in oxide equivalent. The insulator contains 1 to 5 wt % of an Si component, 0.1 to 1 wt % of an Mg component, 2 wt % or less of a Ca component, 0.3 to 6 wt % of a Ba component, and 0.11 to 5 wt % of a rare earth component, in oxide equivalent. In analysis using a scanning transmission electron microscope with a probe diameter of an electron beam set at 1 nm, Si and a rare earth element are detected at a crystal grain boundary having a thickness of 15 nm or less, and an alkaline earth metal at the crystal grain boundary is less than a detection limit.

6 Claims, 6 Drawing Sheets

(51) Int. Cl.
*H01T 13/38* (2006.01)
*H01T 13/60* (2011.01)
*C04B 35/111* (2006.01)

(52) U.S. Cl.
CPC .... *C04B 2235/725* (2013.01); *C04B 2235/77* (2013.01); *C04B 2235/781* (2013.01); *C04B 2235/785* (2013.01); *C04B 2235/85* (2013.01); *C04B 2235/96* (2013.01)

(56) References Cited

U.S. PATENT DOCUMENTS

| | | |
|---|---|---|
| 10,348,061 B2 * | 7/2019 | Yamada ................. H01T 13/38 |
| 2015/0047880 A1 | 2/2015 | Takaoka et al. |
| 2018/0375299 A1 * | 12/2018 | Yamada ................. H01T 13/38 |

* cited by examiner

SPARK PLUG

CROSS REFERENCE TO RELATED APPLICATION

The present application claims priority to Japanese Patent Application No. 2017-125610, which was filed on Jun. 27, 2017, the disclosure of which is herein incorporated by reference in its entirety.

BACKGROUND OF THE INVENTION

Field of the Invention

The present invention relates to a spark plug, and in particular, relates to a spark plug that enables enhancement in dielectric strength performance.

Description of Related Art

A spark plug used for an internal combustion engine has an insulator made from an alumina-based sintered body mainly composed of alumina, for example. In general, the alumina-based sintered body is formed by sintering mixed powder containing a sintering additive including an Si component, etc. (for example, Patent Document 1). In the technology disclosed in Patent Document 1, the grain size in a crystal phase is controlled, whereby dielectric strength performance under high-temperature environment is improved.

Related Art Document

Patent Document 1 is International Publication No. WO 2013/128525.

BRIEF SUMMARY OF THE INVENTION

However, for the above technology, further enhancement of dielectric strength performance under high-temperature environment is required.

The present invention has been made to meet the above requirement, and an object of the present invention is to provide a spark plug having an insulator that enables enhancement in dielectric strength performance under high-temperature environment.

To achieve the above object, a spark plug of the present invention includes an insulator made from an alumina-based sintered body. The insulator contains 90 to 98 wt % of an Al component, 1 to 5 wt % of an Si component, 0.1 to 1 wt % of an Mg component, 2 wt % or less of a Ca component, 0.3 to 6 wt % of a Ba component, and 0.11 to 5 wt % of a rare earth component, in oxide equivalent. In analysis using a scanning transmission electron microscope with a probe diameter of an electron beam set at 1 nm, Si and a rare earth element are detected at a crystal grain boundary having a thickness of 15 nm or less, and an alkaline earth metal at the crystal grain boundary is less than a detection limit.

In the spark plug according to the first aspect, the insulator contains 90 to 98 wt % of an Al component in oxide equivalent, 1 to 5 wt % of an Si component in oxide equivalent, 0.1 to 1 wt % of an Mg component in oxide equivalent, 2 wt % or less of a Ca component in oxide equivalent, 0.3 to 6 wt % of a Ba component in oxide equivalent, and 0.11 to 5 wt % of a rare earth component in oxide equivalent. As a result, a glass phase having a low melting point is formed to a proper extent at the time of sintering, whereby the alumina-based sintered body can be densified. In addition, Si and a rare earth element are detected at a crystal grain boundary having a thickness of 15 nm or less, and alkaline earth metals such as Mg, Ca, and Ba at the crystal grain boundary are less than a detection limit. In other words, at a crystal grain boundary having a thickness of 15 nm or less, Si and a rare earth element are detected and an alkaline earth metal is less than a detection limit. As a result, embrittlement at the crystal grain boundary under high-temperature environment can be suppressed, whereby dielectric strength performance under high-temperature environment can be enhanced.

In the spark plug according to the second aspect, a content of the Ba component is 1 to 6 wt %. As a result, in addition to the effects of the first aspect, densification of the alumina-based sintered body can be facilitated.

In the spark plug according to the third aspect, a content of the Ca component is 0.3 wt % or less. As a result, in addition to the effects of the first or second aspect, suppression of embrittlement at the grain boundary under high-temperature environment can be facilitated.

In the spark plug according to the fourth aspect, a content of the Si component is 1 to 2.7 wt %. As a result, in addition to the effects of any one of the first to third aspects, segregation of a glass phase can be suppressed while densification of the alumina-based sintered body is ensured.

In the spark plug according to the fifth aspect, a relative density of the insulator is 94 to 99%, and a percentage of pores having sizes of 1 µm or greater among pores existing in (at) a mirror-polished surface in any cross section of the insulator is 1% or less. Thus, in addition to the effects of any one of the first to fourth aspects, the dielectric strength property and the mechanical strength under high-temperature environment can be enhanced.

In the spark plug according to the sixth aspect, the insulator contains 100 to 2000 ppm of an Na component in oxide equivalent. As a result, in addition to the effects of any one of the first to fifth aspects, the alumina-based sintered body can be densified, and deposition of Na at the crystal grain boundary is suppressed, whereby the dielectric strength performance under high-temperature environment can be ensured.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

Figure 1:
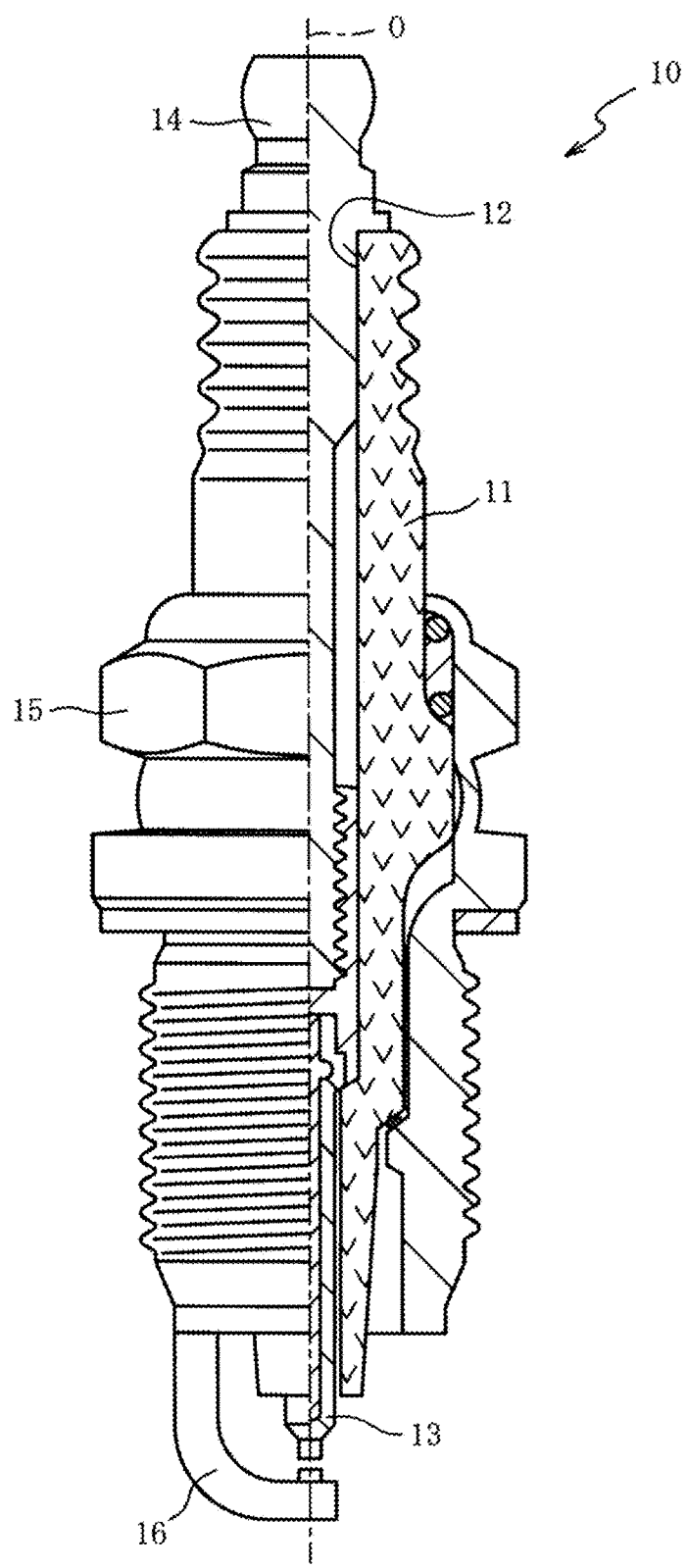
FIG. 1 is a half-sectional view of a spark plug according to one embodiment of the present invention.

Hereinafter, preferred embodiments of the present invention will be described with reference to the accompanying drawings. FIG. 1 is a half-sectional view of a spark plug 10 according to one embodiment of the present invention, with an axial line O as a boundary. In FIG. 1, the lower side on the drawing sheet is referred to as a front side of the spark plug 10, and the upper side on the drawing sheet is referred to as a rear side of the spark plug 10. As shown in FIG. 1, the spark plug 10 includes an insulator 11, a center electrode 13, a metal shell 15, and a ground electrode 16.

The insulator 11 is a substantially cylindrical member made from an alumina-based sintered body which is excellent in mechanical property and insulation property at high temperature. The insulator 11 has an axial hole 12 penetrating therethrough along the axial line O. The center electrode 13 is a bar-like electrode which is made of metal (for example, a nickel based alloy) and which is inserted into the axial hole 12 and held on the front side of the insulator 11.

A metal terminal 14 is a bar-like member to which a high-voltage cable (not shown) is connected and which is made from a conductive metal material (for example, low-carbon steel). The metal terminal 14 is attached to the insulator 11, and the front side of the metal terminal 14 is located inside the axial hole 12. The metal terminal 14 is electrically connected to the center electrode 13 inside the axial hole 12.

The metal shell 15 is a substantially cylindrical member fixed to a screw hole (not shown) of an internal combustion engine, and is made from a conductive metal material (for example, low-carbon steel). The ground electrode 16 is a bar-like member made of metal (for example, a nickel based alloy) and joined to the metal shell 15. The ground electrode 16 is opposed to the center electrode 13 with a spark gap therebetween.

Figure 2:
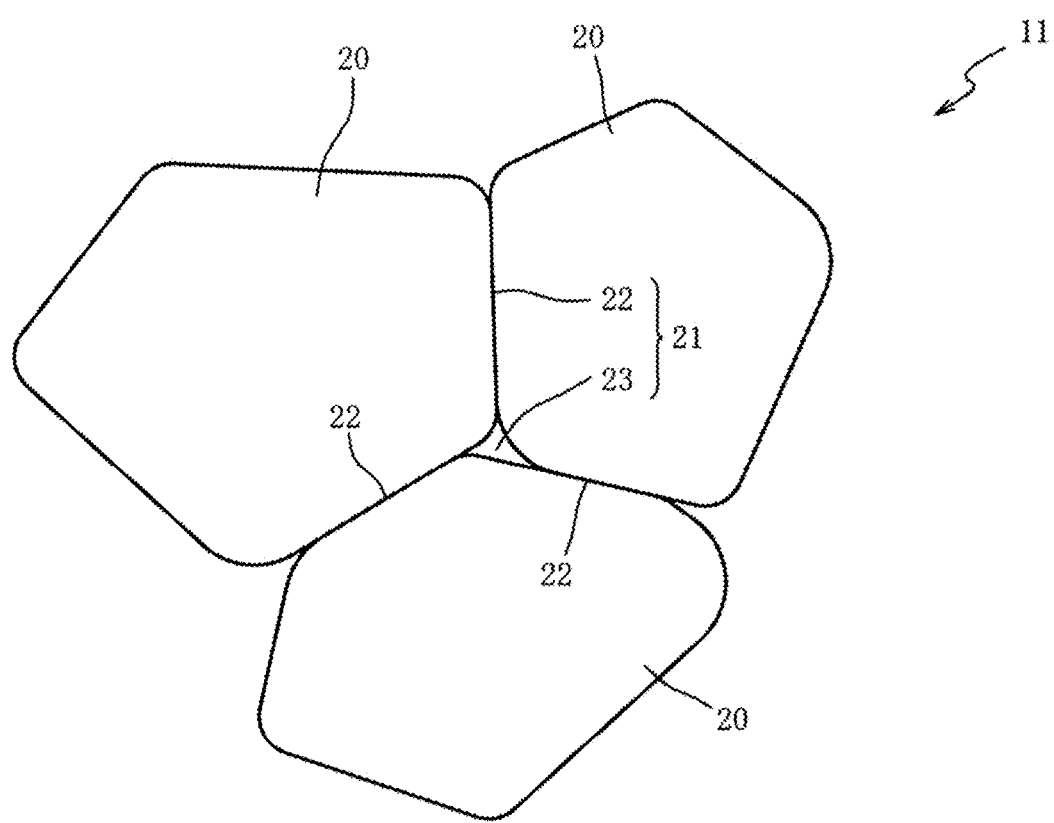
FIG. 2 is a schematic diagram of the grain structure of an insulator.

FIG. 2 is a schematic diagram of the grain structure of the insulator 11. In FIG. 2, only a small part of the grain structure of the insulator 11 is shown in an enlarged manner. The insulator 11 made from an alumina-based sintered body includes crystal grains 20 mainly constituted of alumina ($Al_2O_3$), and crystal grain boundaries 21 which are the boundaries among the crystal grains 20. The crystal grain boundaries 21 include a two-crystal-grain boundary 22 which is the boundary between the two crystal grains 20, and a multiple-crystal-grain boundary 23 which is the boundary among three or more crystal grains 20.

The alumina-based sintered body forming the insulator 11 contains Al, Si, Ba, and rare earth elements. The alumina-based sintered body contains 90 to 98 wt % of an Al component in $Al_2O_3$ equivalent. Thus, sinterability is ensured and excellent dielectric strength performance can be obtained. The Al component exists in the crystal grains 20 while forming crystal phases such as $Al_2O_3$, $BaAl_2O_{19}$, and $BaAl_2Si_2O_8$, and also exists at the crystal grain boundaries 21.

The Si component is a component derived from the sintering additive, and exists as oxide, ion, and the like in the alumina-based sintered body. Normally, at the time of sintering, the Si component melts to form a liquid phase, and functions as a sintering additive for promoting densification of the sintered body. After sintering, the Si component exists in the crystal grains 20 while forming crystal phases such as $BaAl_2Si_2O_8$, and also exists as a part of a glass framework at the crystal grain boundaries 21. The alumina-based sintered body contains 1 to 5 wt % of, or preferably, 1 to 2.7 wt % of an Si component in $SiO_2$ equivalent. Thus, while densification of the sintered body is promoted, a glass phase having a low melting point can be prevented from being excessively formed at the crystal grain boundaries 21. In addition, the Si component together with the Al component and the Ba component forms $BaAl_2Si_2O_8$ having high adhesion with $Al_2O_3$, thus enhancing the dielectric strength property and the mechanical property.

The Ba component is a component derived from the sintering additive, and exists as oxide, ion, and the like in the alumina-based sintered body. Normally, at the time of sintering, the Ba component melts to form a liquid phase, and functions as a sintering additive for promoting densification of the sintered body. After sintering, the Ba component exists in the crystal grains 20 while forming crystal phases such as $BaAl_2O_{19}$ and $BaAl_2Si_2O_8$, and also exists at the crystal grain boundaries 21.

The alumina-based sintered body contains 0.3 to 6 wt % of, or preferably, 1 to 6 wt % of a Ba component in BaO equivalent. Thus, while densification of the sintered body is promoted, a glass phase having a low melting point can be prevented from being excessively formed at the crystal grain boundaries 21. Further, the Ba component forms a crystal phase such as $BaAl_2Si_2O_8$ together with Si which easily forms a glass phase having a low melting point, thereby suppressing formation of a glass phase containing Si, and thus enhancing the dielectric strength property and the mechanical strength.

The alumina-based sintered body can contain alkaline earth metals such as Mg and Ca other than Ba. The Mg component and the Ca component function as a sintering additive like the Ba component. After sintering, these components exist as oxide, ion, and the like in the crystal grains 20 and the crystal grain boundaries 21. The alumina-based sintered body contains 0.1 to 1 wt % of an Mg component in MgO equivalent. In addition, the alumina-based sintered body contains 2 wt % or less of, or preferably, 0.3 wt % or less of a Ca component in CaO equivalent. Thus, while densification of the sintered body is promoted, a glass phase having a low melting point can be prevented from being excessively formed at the crystal grain boundaries 21.

The rare earth component is a component derived from the sintering additive, and includes Sc, Y, La, Ce, Pr, Nd, Pm, Sm, Eu, Gd, Tb, Dy, Ho, Er, Tm, Yb, and Lu. The rare earth component exists as oxide, ion, and the like in the crystal grains 20 and the crystal grain boundaries 21. The rare earth component suppresses abnormal grain growth of alumina at the time of sintering, thereby ensuring the mechanical strength of the insulator. As the rare earth component, a component including Y, La, Pr, Nd, and Yb can be easily handled and thus is suitable. The alumina-based sintered body contains 0.11 to 5 wt % of a rare earth component in oxide equivalent. Thus, while abnormal grain growth of alumina at the time of sintering is suppressed, a glass phase having a low melting point can be prevented from being excessively formed at the crystal grain boundaries 21.

The alumina-based sintered body may contain other elements such as inevitable impurities without deviating from the object of the present invention. Examples of such other elements include Na, S, N, B, Ti, Mn, and Ni. In the case of containing an Na component, the content thereof is preferably 100 to 2000 ppm in $Na_2O$ equivalent. This is for allowing densification of the alumina-based sintered body and ensuring dielectric strength performance under high-temperature environment by suppressing deposition of Na at the crystal grain boundaries.

Next, a method for manufacturing the insulator 11 and the spark plug 10 will be specifically described. Al compound powder as a main component, Si compound powder, Ba compound powder, and rare earth compound powder which are raw material powders of the insulator 11 are mixed with a binder and a solvent, to prepare a slurry. As necessary, additives such as a plasticizer, a defoaming agent, and a dispersing agent may be added. Preferably, the mixing of the raw material powders is performed during eight or more hours so that the mixing state of the raw material powders can be uniformed and the obtained sintered body can be highly densified.

The Al compound powder is not particularly limited as long as the Al compound powder is made of a compound that converts into alumina by sintering. Normally, alumina powder is used. In reality, the Al compound powder can contain an Na component as an inevitable impurity. Therefore, it is preferable to use high-purity Al compound powder, and for example, it is preferable that the purity in the Al compound powder is 99.5% or higher.

As the Al compound powder, in order to obtain a dense alumina-based sintered body, normally, it is desirable to use powder having an average grain size of 0.1 to 5.0 µm. The average grain size is a value measured by a laser diffraction method (microtrac particle size distribution measuring device (MT-3000) manufactured by NIKKISO CO., LTD.).

In order to obtain excellent dielectric strength performance, it is preferable that the Al compound powder is prepared so as to be not less than 90 mass % and not greater than 98 mass % in oxide equivalent, where the mass (in oxide equivalent) of the alumina-based sintered body after sintering is defined as 100 mass %.

The Si compound powder, the compound powder of alkaline earth metal such as Ba, and the rare earth compound powder are not particularly limited as long as they are made of compounds that can be converted into oxides of Si, an alkaline earth metal, and a rare earth element by sintering. For example, various inorganic powders of an oxide of each element, a complex oxide thereof, a hydroxide, a carbonate, a chloride, a sulfate, a nitrate, etc., or powders of natural minerals may be used. It is noted that, in the case of using powder other than an oxide as the Si compound powder or the like, the use amount thereof is specified in mass % in oxide equivalent. The purities and the average grain sizes of the Si compound powder and the like are basically the same as in the case of Al compound powder.

The binder only has to achieve excellent moldability of the raw material powder, and an example of such a binder is a hydrophilic binder. Examples of the hydrophilic binder include polyvinyl alcohol, water-soluble acrylic resin, gum arabic, and dextrin. Of these binders, one kind may be used alone, or two or more kinds may be used in combination.

As the binder, it is preferable to use the one in which the amounts of Na component and K component are small, in order to inhibit crystallization. The binder is blended, preferably, in a proportion of 0.1 to 7 parts by mass, or particularly preferably, in a proportion of 1 to 5 parts by mass, with respect to 100 parts by mass of the raw material powder.

The solvent only has to allow dispersion of the raw material powder, and examples of such a solvent include water and alcohol. Of these solvents, one kind may be used alone, or two or more kinds may be used in combination. The solvent is, preferably, 40 to 120 parts by mass, or particularly preferably, 50 to 100 parts by mass with respect to 100 parts by mass of the raw material powder.

The slurry obtained by mixing the raw material powder, the binder, the solvent, and the like is sprayed and dried by a spray drying method or the like, to be formed into a spherical granulated substance. The average grain size of the granulated substance is, preferably, 30 to 200 µm, or particularly preferably, 50 to 150 µm. The average grain size is a value measured by a laser diffraction method (microtrac particle size distribution measuring device (MT-3000) manufactured by NIKKISO CO., LTD.).

Next, the granulated substance is press-molded by a rubber press, a die press, or the like, thereby obtaining a molded body. The outer surface of the obtained molded body is ground by a resinoid grinding wheel or the like, whereby the shape thereof is adjusted. It is noted that the molding method for the molded body is not limited to press molding, but as a matter of course, another molding method such as injection molding may be employed.

The molded body shaped in a desired shape is, in the atmosphere, subjected to temperature increase to the maximum temperature of 1450° C. or higher within four hours and is sintered at the maximum temperature during 1 to 1.5 hours. Then, the molded body is cooled, whereby an alumina-based sintered body is obtained. Abnormal grain growth of alumina is suppressed and the dielectric strength performance and the mechanical strength of the obtained alumina-based sintered body (insulator 11) are ensured.

Meanwhile, electrode materials such as Ni-based alloy are processed into a predetermined shape and a predetermined dimension, whereby the center electrode 13 and the ground electrode 16 are manufactured. The ground electrode 16 is joined, by resistance welding or the like, to the metal shell 15 formed into a predetermined shape and a predetermined dimension by plastic processing or the like. The center electrode 13 and the metal terminal 14 are attached to the insulator 11 by a known method, and the insulator 11 is attached to the metal shell 15 to which the ground electrode 16 has been joined. The front end portion of the ground electrode 16 is bent to the center electrode 13 side so that the front end of the ground electrode 16 is opposed to the front end of the center electrode 13, whereby the spark plug 10 is manufactured.

The insulator 11 contains 1 to 5 wt % of an Si component, 0.1 to 1 wt % of an Mg component, 2 wt % or less of a Ca component, 0.3 to 6 wt % of a Ba component, and 0.11 to 5 wt % of a rare earth component in oxide equivalent. Thus, a glass phase having a low melting point is formed to a proper extent at the time of sintering, whereby the alumina-based sintered body can be densified. It is noted that element quantitative analysis is performed by, for example, ICP optical emission spectrometry or ICP mass spectrometry.

Figure 3A:
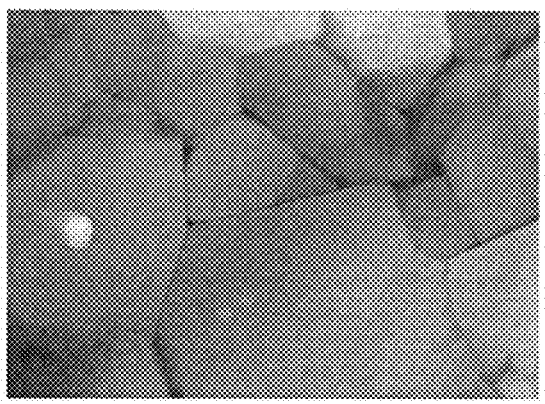
FIG. 3A is a STEM image of the insulator.
Figure 3B:
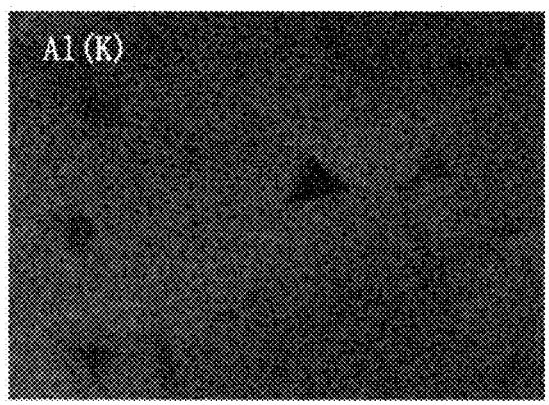
FIG. 3B is a view showing distribution of Al by STEM-EDS.

Next, with reference to FIGS. 3A to 5F, results of analysis of the insulator 11 using a scanning transmission electron microscope with energy dispersive X-ray spectroscopy (STEM-EDS) will be described. FIG. 3A is a STEM image of the insulator 11. FIG. 3B shows distribution of Al by the STEM-EDS, FIG. 3C shows distribution of La, FIG. 3D shows distribution of Ba, FIG. 3E shows distribution of Mg, and FIG. 3F shows distribution of oxygen.

Figure 3C:
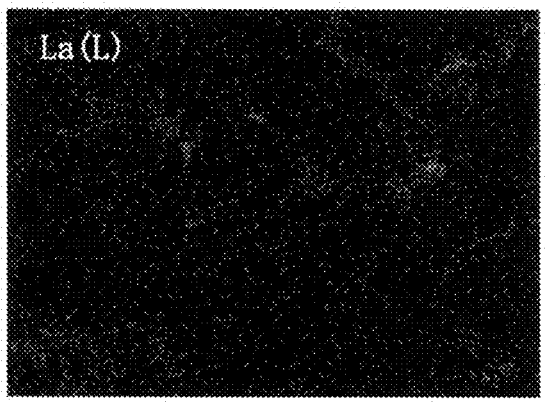
FIG. 3C is a view showing distribution of La.
Figure 3D:
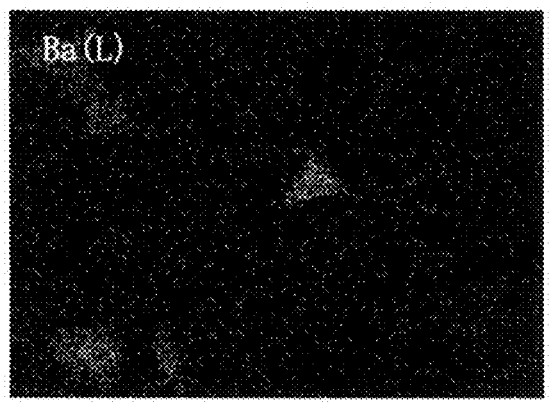
FIG. 3D is a view showing distribution of Ba.
Figure 3E:
FIG. 3E is a view showing distribution of Mg.
Figure 3F:
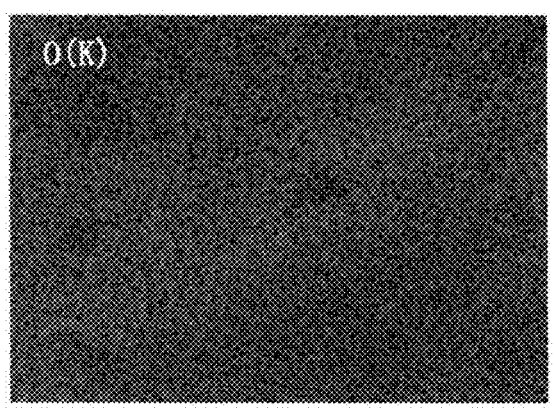
FIG. 3F is a view showing distribution of oxygen.
Figure 4:
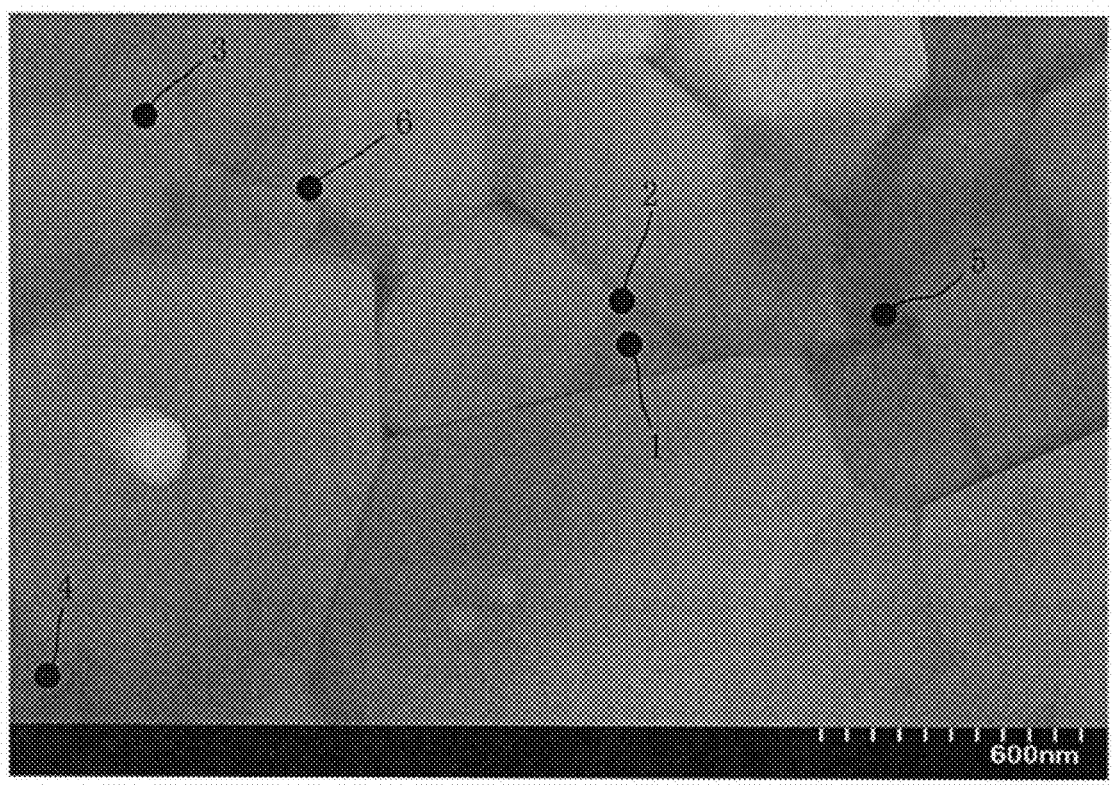
FIG. 4 is a STEM image of the insulator showing the positions of measurement points 1 to 6.
Figure 5A:
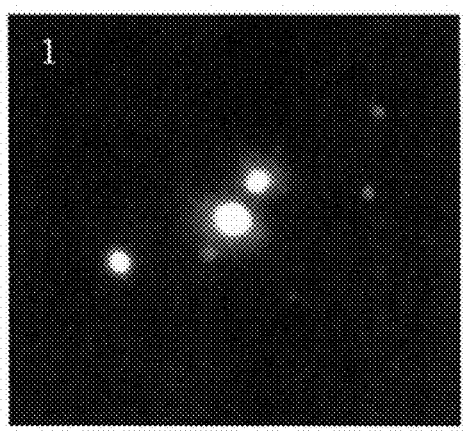
FIG. 5A is an electron beam diffraction pattern at the measurement point 1.
Figure 5B:
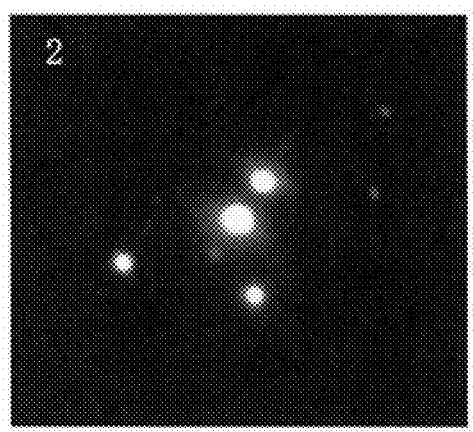
FIG. 5B is an electron beam diffraction pattern at the measurement point 2.
Figure 5C:
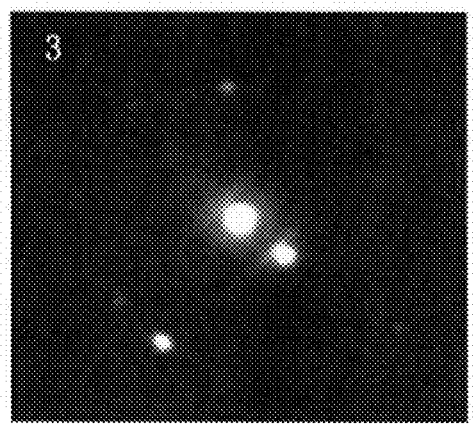
FIG. 5C is an electron beam diffraction pattern at the measurement point 3.
Figure 5D:
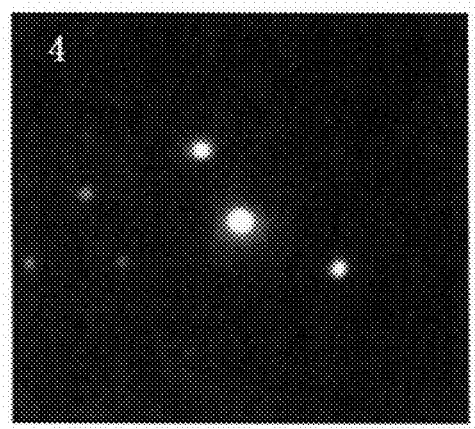
FIG. 5D is an electron beam diffraction pattern at the measurement point 4.
Figure 5E:
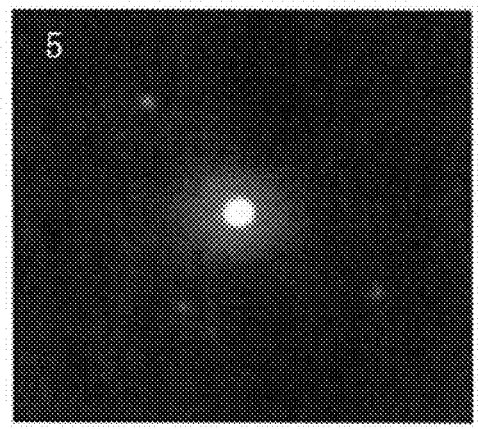
FIG. 5E is an electron beam diffraction pattern at the measurement point 5.
Figure 5F:
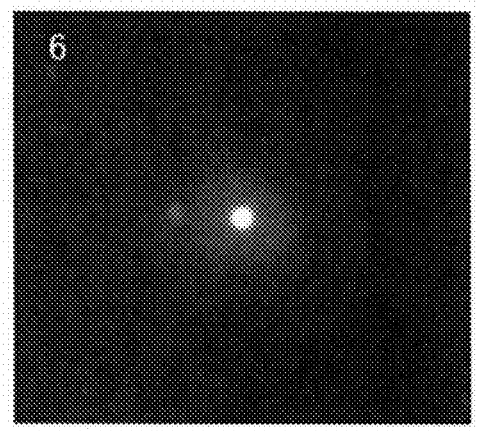
FIG. 5F is an electron beam diffraction pattern at the measurement point 6.

FIG. 4 is a STEM image of the insulator 11 showing the positions of measurement points 1 to 6 of electron beam diffraction patterns. It is noted that all of the measurement points 1 to 6 shown in FIG. 4 are grain boundary triple points (multiple-crystal-grain boundaries 23, see FIG. 2). FIG. 5A is an electron beam diffraction pattern at the measurement point 1, FIG. 5B is an electron beam diffraction pattern at the measurement point 2, FIG. 5C is an electron beam diffraction pattern at the measurement point 3, FIG. 5D is an electron beam diffraction pattern at the measurement point 4, FIG. 5E is an electron beam diffraction pattern at the measurement point 5, and FIG. 5F is an electron beam diffraction pattern at the measurement point 6. FIGS. 3A to 5F show results obtained by analyzing the insulator 11 at a magnification of 50,000 times, using the STEM-EDS with the probe diameter of an electron beam set at 1.0 nm. One scale unit of bars shown in FIG. 4 is 60 nm.

It is noted that, when the insulator 11 is analyzed at a magnification of 200,000 times using the STEM-EDS with the probe diameter of an electron beam set at 1.0 nm, Si and a rare earth element are detected at measurement points randomly selected from portions having thicknesses of 15 nm or less, of the crystal grain boundaries 21 (see FIG. 2). At the measurement points where Si and a rare earth element are detected, alkaline earth metals such as Ba, Mg, Ca, and Sr are less than the detection limit and therefore are not detected. By adjusting the insulator 11 so that no alkaline earth metals are detected at the two-crystal-grain boundaries 22, embrittlement at the two-crystal-grain boundaries 22 under high-temperature environment can be suppressed. As a result, dielectric strength performance of the insulator 11 under high-temperature environment can be enhanced.

By checking FIG. 3C and FIG. 3D with FIG. 4, it can be confirmed that Ba exists at the measurement points 1 to 4 and La exists at the measurement points 5, 6. In addition, as shown in FIG. 5A to FIG. 5D, in the electron beam diffraction patterns at the measurement points 1 to 4, diffraction spots exist and a broad ring-shaped halo pattern is not seen. Thus, it is found that crystallization is made at the measurement points 1 to 4. In the insulator 11, a part where Ba is detected is crystallized, and therefore, under high-temperature environment, embrittlement at the part where Ba is detected, such as multiple-crystal-grain boundary 23, can be suppressed. Therefore, the dielectric strength performance of the insulator 11 under high-temperature environment can be enhanced. Further, since occurrence of an $SiO_2$—BaO—$La_2O_3$-based glass phase which has less strength can be suppressed, the strength of the insulator 11 can be enhanced.

Preferably, the insulator 11 is adjusted so that, among any ten measurement points near the center in the part where Ba is detected as confirmed in FIG. 3D, there are three or more measurement points where halo patterns are seen in the electron beam diffraction patterns. If this condition is satisfied, it is possible to promote densification of the alumina-based sintered body by Ba, and further, it is possible to suppress embrittlement at the part where Ba exists, such as the multiple-crystal-grain boundary 23, under high-temperature environment. Thus, the dielectric strength performance of the insulator 11 under high-temperature environment can be enhanced.

On the other hand, as shown in FIG. 5E and FIG. 5F, broad ring-shaped halo patterns are seen in the electron beam diffraction patterns at the measurement points 5, 6 where La (rare earth element) is detected. Thus, it is found that the states at the measurement points 5, 6 are amorphous (glass phase). Preferably, the insulator 11 is adjusted so that, among any ten measurement points in the part where the rare earth element is detected, there are five or more measurement points where halo patterns are seen and the state is found to be amorphous. In this case, crystallization of the rare earth component which promotes grain growth of alumina at the time of sintering is suppressed, whereby abnormal grain growth of alumina can be suppressed. Thus, the mechanical strength of the insulator 11 can be ensured.

Preferably, the insulator 11 is set so that a ratio (I/II) of a diffraction intensity I (2θ: 22.50°) of $BaAl_2Si_2O_8$ with respect to a diffraction intensity II (2θ: 35.74°) of $BaAl_2O_{19}$ is 0.5 or greater in an X-ray diffraction pattern specified by a diffraction angle and a relative intensity. Thus, the proportion of a crystal phase such as $BaAl_2Si_2O_8$ including Ba and Si which has high adhesion with $Al_2O_3$ can be increased as compared to a crystal phase such as $BaAl_2O_{19}$ which includes Ba but does not include Si. Thus, the interface between the Ba-based crystal phase and the alumina crystal phase can become less likely to be broken, whereby the dielectric strength performance of the insulator 11 can be enhanced.

Preferably, the insulator 11 is adjusted so that the average grain size of the crystal grains 20 (see FIG. 2) is 0.3 to 1.0 μm. The average grain size is calculated by an intercept method. In the intercept method, a test line (straight line) having a known length is drawn on a polished sectional surface of the insulator 11 including the axial line O, the number of the crystal grains 20 which the test line passes through or captures is calculated, and the average grain size is obtained from the number. By setting the average grain size of the crystal grains 20 to 0.3 to 1.0 μm, the mechanical strength of the insulator 11 can be enhanced.

Preferably, the insulator 11 is adjusted so that the arithmetic average roughness (Ra) of the surface thereof is 1 μm or less. This is for making it less likely that the surface irregularity serves as a start point for breakage of the insulator 11. If the insulator 11 is formed by injection molding, the value of Ra of the insulator 11 can be adjusted within the above range. Thus, the mechanical strength of the insulator 11 can be ensured.

The arithmetic average roughness is measured in conformity with JIS B0601-1994. The measurement of the arithmetic average roughness Ra is performed using a contactless shape measurement laser microscope VK-X110/X100 (manufactured by KEYENCE CORP.) or using image analysis software WinROOF (manufactured by MITANI CORP.) which is for analyzing an image obtained by a microscope such as SEM or the like.

Preferably, the relative density of the insulator 11 is 94 to 99%. This is for ensuring the dielectric strength property and the mechanical strength. The relative density is a value obtained by dividing, by a theoretical density, a density calculated by an experiment (Archimedes method). As for the theoretical density, an element, other than Al, contained in an amount of 0.1 wt % or more in the alumina-based sintered body (insulator 11) is quantitatively analyzed by ICP optical emission spectrometry and ICP mass spectrometry, and the rest thereof is calculated as $Al_2O_3$.

Further, it is preferable that, among pores existing in a mirror-polished surface in any cross section of the insulator 11, the percentage of pores having sizes of 1 μm or greater is 1% or less. This is for suppressing stress concentration on the pores. Thus, the dielectric strength property and the mechanical strength of the insulator 11 under the high-temperature environment can be enhanced.

The present invention will be described in more detail with reference to examples. However, the present invention is not limited to the examples.

Manufacturing of Alumina-Based Sintered Body

As raw material powder, alumina powder having an average grain size of 0.2 to 2.1 μm, $SiO_2$ powder, and carbonate powder of Ba, Ca, Mg, and La were prepared. The raw material powder obtained by mixing these powders at various ratios, polyvinyl alcohol as a binder, and water as a solvent were mixed to prepare various slurries.

The obtained slurries were sprayed and dried by a spray drying method or the like, to be formed into spherical granulated substances having average grain sizes of about 100 µm. The obtained granulated substances were kneaded with a thermoplastic resin and then injection molding is performed to obtain various molded bodies. In the atmosphere, these molded bodies were sintered such that the sintering period within a temperature range of 1450° C. to 1650° C. was set at 1 to 8 hours, thereby obtaining various sintered bodies of samples 1 to 29 (including specimens sintered in a shape of the insulator 11). Hereinafter, the evaluation method for samples (sintered bodies) will be described.

Component Analysis

The compositions, i.e., the content of each component, of the sintered bodies in samples 1 to 12 were detected by ICP optical emission spectrometry. The content of each component was calculated as a mass percentage (%), where the sum of masses of detected components in oxide equivalent was defined as 100 wt %.

Stem-Eds

Regarding the sintered bodies in samples 1 to 23 and 27 to 29, information about compositions was obtained using STEM-EDS (HD-2000 manufactured by HITACHI, LTD.). The acceleration voltage was set at 200 kV and the probe diameter of an electron beam was set at 1.0 nm, and element analysis, element mapping, and electron beam diffraction by EDS were performed at a magnification of 50,000 times.

In the element analysis by EDS, electrons were applied to a part having a thickness of 15 nm or less among the crystal grain boundaries 21 (see FIG. 2), during three minutes, thereby obtaining data. Analysis of alkaline earth metals at that part was performed by a thin-film approximation method. If the density percentage calculated from the intensity of Ba-L line or Ca-K line relative to the intensity of Si-K line was 10.0% or less, this was considered to be due to noise and it was determined that no alkaline earth metal existed at that part (less than detection limit).

In addition, electron beam diffraction was performed for any ten measurement points near the center in the part where Ba was detected by element mapping. In addition, electron beam diffraction was performed for any ten measurement points in the grain boundary triple point where La was detected. Whether the electron beam diffraction pattern at each measurement point indicated a halo pattern was checked.

Average Grain Size

For each sintered body (insulator 11) in samples 1 to 29, the sectional surface thereof including the axial line O (see FIG. 1) was subjected to mirror polishing and then subjected to thermal etching. Instead of thermal etching, chemical etching may be performed. The etched sectional surface was observed using an SEM. The acceleration voltage of the SEM was set at 15 kV, and the working distance was set at 10 to 12 mm. SEM images having a rectangular area in which the magnitude of one visual field was 200 µm×200 µm were randomly captured for ten visual fields.

Next, the average grain sizes were calculated by an intercept method. First, crystal grains overlapping at least one of the two diagonal lines in the rectangular area of each obtained SEM image were selected, and then, for each selected crystal grain, the maximum diameter thereof was calculated and was defined as a long diameter D1. The maximum diameter is the largest value among the outer diameters of the crystal grain measured from every direction. Then, the outer diameter of the crystal grain along the line passing through the center of the long diameter D1 and perpendicular to the long diameter D1 was defined as a short diameter D2. The average value of the long diameter D1 and the short diameter D2 was defined as a deemed grain size of the crystal grain. The average value of the deemed grain sizes of n crystal grains overlapping at least one of the diagonal lines was defined as the average grain size in this visual field. Since the average grain size varies more or less among the visual fields of SEM images, the average value among the ten visual fields was used as the average grain size.

Dielectric Strength Test

Figure 6:
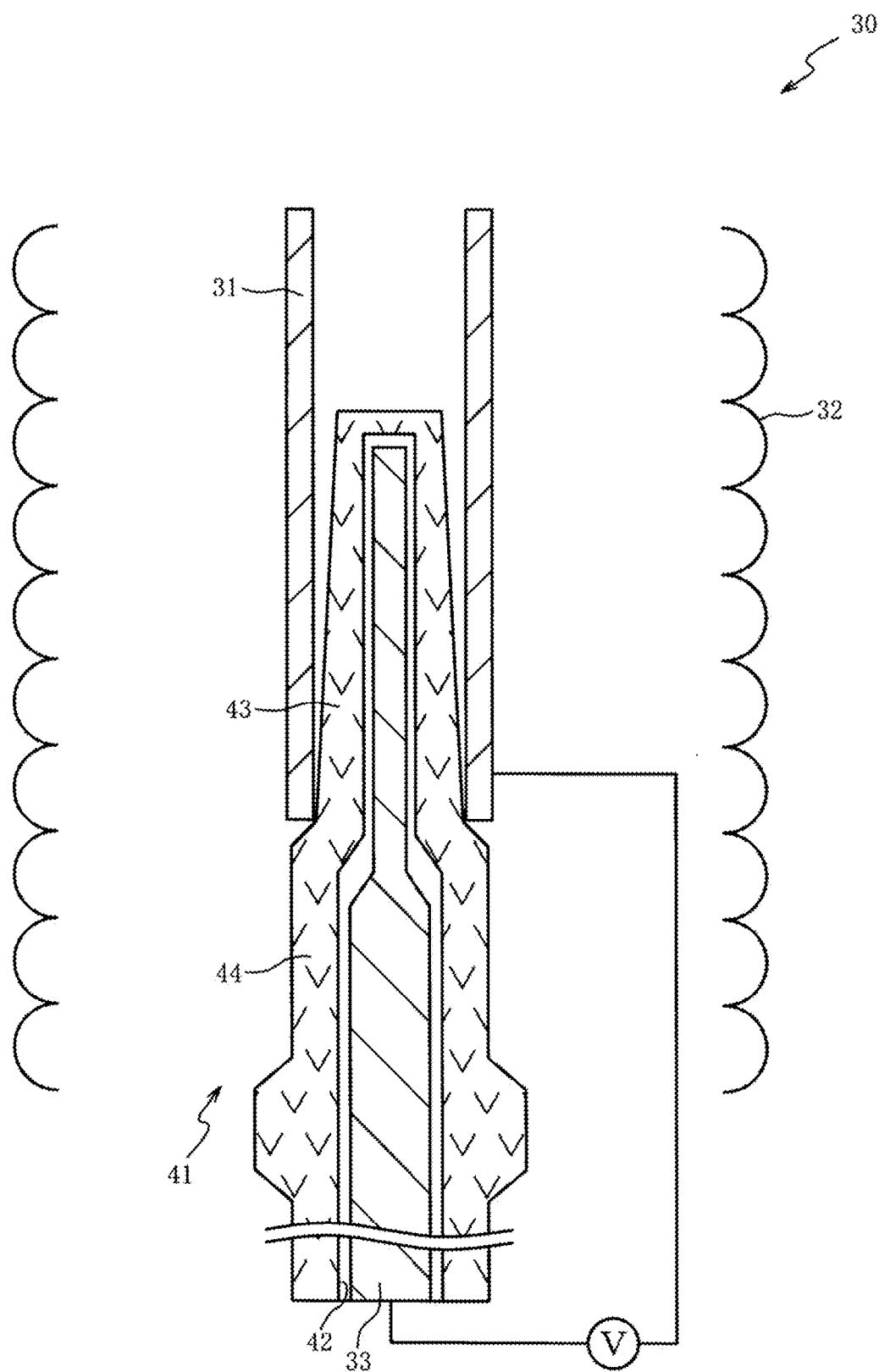
FIG. 6 is a sectional view of a dielectric strength testing device.

Using a dielectric strength testing device 30 shown in FIG. 6, a high-temperature dielectric strength test was performed at 800° C. for a bottomed cylindrical specimen 41 (alumina-based sintered body) in each of samples 1 to 20 and 24 to 26. FIG. 6 is a sectional view of the dielectric strength testing device 30.

As shown in FIG. 6, the specimen 41 has an axial hole 42 at the center in the axial line direction. An end of the axial hole 42 is closed. The specimen 41 has a cylindrical small-diameter portion 42 closed at the end of the axial hole 42, and a cylindrical large-diameter portion 44 having a larger diameter than the small-diameter portion 43. The small-diameter portion 42 and the large-diameter portion 44 are continuously connected to each other in the axial line direction. The dielectric strength testing device 30 includes a metallic ring-shaped member 31, a heater 32 for heating the ring-shaped member 31, and a bar-like electrode 33 for applying high voltage between the bar-like electrode 33 and the ring-shaped member 31. The electrode 33 is made of Ni alloy.

The electrode 33 was inserted from the opening of the axial hole 42 of the specimen 41 to the end of the axial hole 42, and the ring-shaped member 31 was arranged so that the inner circumferential surface of the ring-shaped member 31 came into contact with the outer circumferential surface near the boundary between the small-diameter portion 42 and the large-diameter portion 44 of the specimen 41. In this state, the dielectric strength of the specimen 41 was measured.

Specifically, in a state in which heating was performed by the heater 32 so that the temperature around the specimen 41 reached 800° C., voltage was applied between the ring-shaped member 31 and the electrode 33. The voltage was boosted at a rate of 1.5 kV/s, and when dielectric breakdown occurred in the specimen 41, i.e., when the specimen 41 was penetrated so that voltage could not be boosted, the voltage value was measured.

The specimen 41 having undergone dielectric breakdown was extracted from the dielectric strength testing device 30, and the thickness from the outer circumferential surface of the specimen 41 to the axial hole 42 at the part penetrated by dielectric breakdown was measured. A value (kV/mm) obtained by dividing, by the thickness, the voltage value when dielectric breakdown occurred was used as the dielectric strength.

Bending Strength

On the basis of JIS R1601-2008, 3-point bending strength was measured at a room temperature (5 to 35° C.)

Arithmetic Average Roughness

For each sintered body (insulator 11) in samples 21 to 23, the arithmetic average roughness in the axial line O direction at the front end portion of the insulator 11 was measured using a shape measurement laser microscope VK-X110/X100 (manufactured by KEYENCE CORP.).

Bending Test

For each sintered body (insulator 11) in samples 21 to 23, using a material testing machine, a load in a direction perpendicular to the axial line O was applied to the front end portion of the insulator 11 (see FIG. 1) from three different directions around the circumferential direction, and the load (breaking load) when the insulator 11 was broken was measured.

X-Ray Diffraction

For each sintered body in samples 24 to 26, after polishing processing was performed, X-ray diffraction analysis was performed using an X-ray diffraction device (model: Smart Lab) manufactured by RIGAKU CORP., under the following measurement condition: X-ray: CuKα (λ1.54 Å), X-ray output: 40 kV to 30 mA, scan speed (counting time): 20.0, sampling width: 0.02 deg, entrance slit: 1/2 deg, receiving slit (1): 15.000 mm, and receiving slit (2): 20.000 mm.

From the obtained X-ray diffraction pattern, a ratio (I/II) of a diffraction intensity I (2θ: 22.50°) of $BaAl_2Si_2O_8$ with respect to a diffraction intensity II (2θ: 35.74°) of $BaAl_2O_{19}$ was calculated. The diffraction intensity of each peak in the X-ray diffraction pattern was calculated by data processing using data analysis software "peak search" manufactured by RIGAKU CORP., with smoothing by weighted average (smoothing point number 11), and with background elimination (peak width threshold 0.10, intensity threshold 0.01).

It is noted that the relative densities of the sintered bodies in samples 1 to 29 were 94 to 99%, and among pores existing in a mirror-polished surface in any cross section of each sintered body, the percentage of pores having sizes of 1 μm or greater was less than 1%. In addition, in the sintered bodies in samples 1 to 29, the content of an Na component was 100 to 2000 ppm in oxide ($Na_2O$) equivalent.

Table 1 shows a result of measurements of compositions in samples 1 to 12, elements detected at the crystal grain boundaries having thicknesses of 15 nm or less, the average grain size, and the dielectric strength and the bending strength at 800° C.

fore the dielectric strength performance under high-temperature environment was enhanced as compared to samples 11, 12.

It is inferred that the reason why Ca was detected at the crystal grain boundaries in sample 12 is because the content of a Ca component was higher than 2 wt %. In addition, it is inferred that the reason why Ba was detected at the crystal grain boundaries in sample 11 is because the sintering period was longer than those for the other samples.

It is found that the bending strength in the samples 2, 10 in which the content of a Ba component was lower than 1 wt % is smaller as compared to the other samples. It is inferred that, in samples 2, 10, since the content of a Ba component was low and crystal phases including Si, such as $BaAl_2Si_2O_8$, were less likely to be formed, the effect of suppressing formation of a glass phase including Si was reduced and thus the strength at the crystal grain boundaries was reduced.

It is found that the bending strength in sample 8 in which the content of a Ca component was higher than 0.3 wt % is lower as compared to samples 1, 3 to 7, and 9. It is inferred that, in sample 8, the strength was reduced because a glass phase having a low strength was formed, due to a Ca component, at the crystal grain boundaries.

It is found that the bending strength in samples 5, 7 in which the content of an Si component was 2.7 wt % or less was 710 MPa or greater. It is inferred that, in samples 5, 7, since the content of an Si component was low and generation of a glass phase having a low strength was suppressed, the strength was enhanced.

Table 2 shows a result of measurements of elements detected at crystal grain boundaries having thicknesses of 15 nm or less in samples 13 to 20, the number of measurement points where the electron beam diffraction patterns indicated halo patterns among any ten measurement points near the center in the part where Ba was detected, the average grain size, and the dielectric strength and the bending strength at 800° C.

TABLE 1

| No | Composition (wt %) | | | | | | Elements detected at grain boundary | Average grain size (μm) | Dielectric strength (kv/mm) | Bending strength (MPa) |
|---|---|---|---|---|---|---|---|---|---|---|
| | $Al_2O_3$ | $SiO_2$ | MgO | CaO | BaO | $La_2O_3$ | | | | |
| 1 | 94 | 3.0 | 0.5 | 0 | 2.0 | 0.50 | Si, La | 0.5 | 230 | 720 |
| 2 | 90 | 3.5 | 1.0 | 0 | 0.5 | 5.00 | Si, La | 0.5 | 215 | 641 |
| 3 | 94 | 3.8 | 0.5 | 0 | 1.6 | 0.11 | Si, La | 0.5 | 210 | 702 |
| 4 | 91 | 5.0 | 0.3 | 0 | 2.8 | 0.90 | Si, La | 0.5 | 210 | 680 |
| 5 | 91 | 1.7 | 0.3 | 0 | 6.0 | 1.00 | Si, La | 0.5 | 210 | 712 |
| 6 | 94 | 3.0 | 0.5 | 0.3 | 1.7 | 0.50 | Si, La | 0.5 | 216 | 672 |
| 7 | 94 | 2.7 | 0.5 | 0 | 2.3 | 0.50 | Si, La | 0.5 | 230 | 720 |
| 8 | 93 | 3.0 | 0.5 | 2.0 | 1.0 | 0.50 | Si, La | 0.5 | 200 | 643 |
| 9 | 94 | 3.0 | 0.5 | 0 | 1.0 | 1.50 | Si, La | 0.5 | 192 | 660 |
| 10 | 98 | 1.0 | 0.4 | 0 | 0.3 | 0.30 | Si, La | 0.5 | 200 | 605 |
| 11 | 94 | 3.0 | 0.5 | 0 | 2.0 | 0.50 | Si, La, Ba | 0.5 | 130 | 688 |
| 12 | 92 | 3.0 | 0.5 | 3.0 | 1.0 | 0.50 | Si, La, Ca | 0.5 | 126 | 669 |

In samples 1 to 10, Si and La were detected at the crystal grain boundaries, whereas in samples 11, 12, Ba or Ca as well as Si and La was detected at the crystal grain boundaries. It is found that the dielectric strengths in samples 1 to 10 are significantly higher as compared to the dielectric strengths in samples 11, 12 in which Ba or Ca was detected at the crystal grain boundaries. It is inferred that, in samples 1 to 10, embrittlement at the crystal grain boundaries under high-temperature environment can be suppressed, and there-

TABLE 2

| No | Elements detected at grain boundary | Number of points where halo patterns were seen | Average grain size (μm) | Dielectric strength (kv/mm) | Bending strength (MPa) |
|---|---|---|---|---|---|
| 13 | Si, La | 0 | 0.6 | 230 | 710 |
| 14 | Si, La | 0 | 1.0 | 210 | 630 |
| 15 | Si, La | 0 | 0.3 | 210 | 720 |
| 16 | Si, La | 0 | 0.2 | 210 | 450 |

TABLE 2-continued

| No | Elements detected at grain boundary | Number of points where halo patterns were seen | Average grain size (μm) | Dielectric strength (kv/mm) | Bending strength (MPa) |
|---|---|---|---|---|---|
| 17 | Si, La | 0 | 1.5 | 210 | 500 |
| 18 | Si, La, Ba | 0 | 0.6 | 180 | 620 |
| 19 | Si, La | 3 | 0.6 | 160 | 620 |
| 20 | Si, La | 5 | 0.6 | 150 | 600 |

Samples 19, 20 are samples in which halo patterns were seen at three or five points among any ten measurement points in the part where Ba was detected, and indicate that crystallization had not progressed at the part where Ba was detected, as compared to samples 1 to 18. It is found that the dielectric strengths in samples 19, 20 are lower as compared to samples 1 to 18. Further, it is found that the dielectric strength in sample 20 indicating five measurement points where halo patterns were seen is lower as compared to sample 19 indicating three measurement points where halo patterns were seen. Accordingly, it is inferred that it is effective to suppress embrittlement at the multiple-crystal-grain boundaries 23 (see FIG. 2) and the like under high-temperature environment by progressing crystallization at the part where Ba was detected (mainly at multiple-crystal-grain boundaries 23) in order to enhance the dielectric strength under high-temperature environment.

In samples 13 to 17, Si and La were detected at the crystal grain boundaries (mainly two-crystal-grain boundaries 22), whereas in sample 18, Ba as well as Si and La was detected at the crystal grain boundaries. It is found that the dielectric strengths in samples 13 to 17 are higher as compared to the dielectric strength in sample 18. It is inferred that, in samples 13 to 17, since embrittlement at the two-crystal-grain boundaries 22 (see FIG. 2) under high-temperature environment can be suppressed, the dielectric strength performance under high-temperature environment was enhanced as compared to sample 18. Accordingly, it is found that, in order to enhance the dielectric strength performance under high-temperature environment, as in samples 13 to 17, it is desirable that Si and La (rare earth elements) are caused to exist at the crystal grain boundaries having thicknesses of 15 nm or less and diffraction spots are caused to exist in the electron beam diffraction pattern at the part where Ba is detected.

Sample 16 is a sample in which the average grain size was less than 0.3 μm, and sample 17 is a sample in which the average grain size was greater than 1.0 μm. It is found that the bending strengths in samples 13 to 15 in which the average grain sizes were 0.3 to 1.0 μm are greater as compared to samples 16, 17. It is inferred that, in sample 16, grain growth during sintering was insufficient and thus the strength was low, and in sample 17, coarse grains existed and thus the strength was reduced.

Table 3 shows a result of measurements of elements detected at the crystal grain boundaries having thicknesses of 15 nm or less in samples 21 to 23, the number of measurement points where the electron beam diffraction patterns indicated halo patterns among any ten measurement points near the center in the part where Ba was detected, the average grain size, the arithmetic average roughness at the front end portion of the insulator 11, and a breaking load in a bending test.

TABLE 3

| No | Elements detected at grain boundary | Number of points where halo patterns were seen | Average grain size (μm) | Arithmetic average roughness (μm) | Bending test (N) |
|---|---|---|---|---|---|
| 21 | Si, La | 0 | 0.6 | 1.0 | 1000 |
| 22 | Si, La | 0 | 0.6 | 0.5 | 1000 |
| 23 | Si, La | 0 | 0.6 | 3.0 | 400 |

Sample 23 is a sample in which the arithmetic average roughness was greater than 1.0 μm. It is found that, in samples 21, 22 in which the arithmetic average roughness was 1.0 μm or less, a breaking load in a bending test is greater as compared to sample 23. It is inferred that, in sample 23, the surface irregularity at the front end portion of the insulator 11 served as a start point for breakage and thus the breaking load was small.

Table 4 shows a result of measurements of elements detected at the crystal grain boundaries having thicknesses of 15 nm or less in samples 24 to 26, a ratio (I/II) of a diffraction intensity I ($2\theta$: 22.50°) of $BaAl_2Si_2O_8$ with respect to a diffraction intensity II ($2\theta$: 35.74°) of $BaAl_2O_{19}$ calculated from each X-ray diffraction pattern, the average grain size, and the dielectric strength at 800° C.

TABLE 4

| No | Elements detected at grain boundary | I/II | Average grain size (μm) | Dielectric strength (kv/mm) |
|---|---|---|---|---|
| 24 | Si, La | 0.5 | 0.6 | 210 |
| 25 | Si, La | 2.0 | 0.6 | 230 |
| 26 | Si, La | 0.3 | 0.6 | 200 |

Sample 26 is a sample in which the value of I/II was less than 0.5. It is found that the dielectric strengths in samples 24, 25 in which the value of I/II was 0.5 or greater are greater as compared to sample 26. It is inferred that, in sample 26, the amount of $BaAl_2O_{19}$ was greater as compared to samples 24, 25, and the interface connection strength between a crystal phase of $Al_2O_3$ and a crystal phase of $BaAl_2O_{19}$ is smaller than the interface connection strength between a crystal phase of $Al_2O_3$ and a crystal phase of $BaAl_2Si_2O_8$, and therefore in sample 26, dielectric breakdown occurred at the interface between a crystal phase of $Al_2O_3$ and a crystal phase of $BaAl_2O_{19}$.

Table 5 shows a result of measurements of elements detected at the crystal grain boundaries having thicknesses of 15 nm or less in samples 27 to 29, the number of measurement points where the electron beam diffraction patterns indicated halo patterns among any ten measurement points in the part where La was detected, the average grain size, and the bending strength.

TABLE 5

| No | Elements detected at grain boundary | Number of points where halo patterns were seen | Average grain size (μm) | Bending strength (MPa) |
|---|---|---|---|---|
| 27 | Si, La | 10 | 0.6 | 700 |
| 28 | Si, La | 5 | 0.6 | 650 |
| 29 | Si, La | 0 | 0.6 | 600 |

In sample 27, the electron beam diffraction patterns for ten points among any ten measurement points in the grain boundary triple point where La was detected, indicated halo patterns. In sample 29, in the electron beam diffraction patterns for ten points among any ten measurement points in the part where La was detected, diffraction spots were confirmed and no halo pattern was seen. Sample 27 indicates that crystallization had not progressed at the part where La was detected, as compared to sample 29. The degree of crystallization in sample 28 is intermediate between the degrees of crystallization in samples 27 and 29.

It is found that the average grain sizes in samples 27, 28, 29 are the same but the bending strength increases in the order of samples 29, 28, 27. It is inferred that, in the order of samples 29, 28, 27, crystallization of the rare earth component which promotes grain growth of alumina at the time of sintering was increasingly suppressed and thus the strengths of the samples were enhanced.

In the above example, the case of blending La as a rare earth element has been described. However, the same result is obtained also in the case of blending another rare earth element such as Y, Pr, Nd, Yb.

Although the present invention has been described based on the embodiment, the present invention is not limited to the above embodiment at all. It can be easily understood that various modifications can be devised without departing from the gist of the present invention.

In the above embodiment, the spark plug 10 that causes spark discharge between the center electrode 13 and the ground electrode 16 joined to the metal shell 15, has been described. However, the spark plug 10 is not necessarily limited thereto. As a matter of course, the alumina-based sintered body described in the embodiment may be applied to insulators of other spark plugs. Examples of other spark plugs include a spark plug that causes barrier discharge around the insulator enclosing the center electrode 13, and a spark plug that causes corona discharge at the front end of the center electrode penetrating the insulator.

DESCRIPTION OF REFERENCE NUMERALS

10: spark plug
11: insulator
21: crystal grain boundary

What is claimed is:

1. A spark plug comprising an insulator made from an alumina-based sintered body, the insulator containing 90 to 98 wt % of an Al component in oxide equivalent, wherein
the insulator contains 1 to 5 wt % of an Si component in oxide equivalent, 0.1 to 1 wt % of an Mg component in oxide equivalent, 2 wt % or less of a Ca component in oxide equivalent, 0.3 to 6 wt % of a Ba component in oxide equivalent, and 0.11 to 5 wt % of a rare earth component in oxide equivalent, such that, in analysis using a scanning transmission electron microscope with a probe diameter of an electron beam set at 1 nm, at a crystal grain boundary having a thickness of 15 nm or less, Si and a rare earth element are detected and an amount of alkaline earth metal is less than a detection limit.

2. The spark plug according to claim 1, wherein a content of the Ba component is 1 to 6 wt %.

3. The spark plug according to claim 1, wherein a content of the Ca component is 0.3 wt % or less.

4. The spark plug according to claim 1, wherein a content of the Si component is 1 to 2.7 wt %.

5. The spark plug according to claim 1, wherein
a relative density of the insulator is 94 to 99%, and
a percentage of pores having sizes of 1 μm or greater among pores existing at a mirror-polished surface in any cross section of the insulator is 1% or less.

6. The spark plug according to claim 1, wherein the insulator contains 100 to 2000 ppm of an Na component in oxide equivalent.

* * * * *